United States Patent [19]
Studanski

[11] Patent Number: 5,396,035
[45] Date of Patent: Mar. 7, 1995

[54] METHOD AND APPARATUS FOR MECHANICAL FORCE/WEIGHT OUTPUT

[76] Inventor: Richard R. Studanski, 320 8th St. NE., Sartell, Minn. 56377

[21] Appl. No.: 937,348

[22] Filed: Aug. 27, 1992

[51] Int. Cl.⁶ ............................................. G01G 19/52
[52] U.S. Cl. .................................. 177/132; 177/225; 177/229; 177/239; 73/862.639; 116/303; 33/561.2
[58] Field of Search ............... 177/225, 229, 239, 132; 73/862.639; 116/303, 212, 284; 33/561.2, 1 N

[56] References Cited

U.S. PATENT DOCUMENTS

| | | | |
|---|---|---|---|
| 2,316,230 | 4/1943 | Endres | 116/284 |
| 2,687,642 | 8/1954 | Livermont | 73/862.639 |
| 2,816,750 | 12/1957 | Martin | 177/229 |
| 2,827,277 | 4/1958 | Dieter | 73/862.639 X |
| 2,987,913 | 6/1961 | Whitehead, Jr. | 177/225 |
| 3,015,951 | 1/1962 | Ochs, Jr. | 116/212 X |
| 3,082,561 | 3/1963 | Convey et al. | 177/229 |
| 3,223,189 | 12/1965 | Robbins | 177/225 |
| 3,871,219 | 3/1975 | Quick et al. | 116/303 X |
| 4,048,948 | 9/1977 | Sarasohn | 116/303 X |
| 4,195,589 | 4/1980 | Blattner | 116/212 X |
| 4,721,174 | 1/1988 | Letzo | 177/225 |
| 5,168,945 | 12/1992 | Byers | 177/225 |

Primary Examiner—Benjamin R. Fuller
Assistant Examiner—Randy W. Gibson

[57] ABSTRACT

A method and apparatus for indicating force, weight in particular, is done mechanically. The method has the steps of engaging the force with a base plate, bending the plate with force, rotating an indicator plate with respect to the base plate and about an obtuse axis hinge movably adjoining the plate, and measuring the rotation and converting it to an expression of force. The Apparatus has a base plate, an indicator plate, a hinge movably adjoining the two plates, an obtuse hinge axis, and structure to measure and interpret rotation of the indicator plate about the obtuse hinge axis as the base plate is bent by a force such as weight. A specific embodiment of the weight scale is provided for a fishing rod, for a fish scale, and for a pail scale.

35 Claims, 7 Drawing Sheets

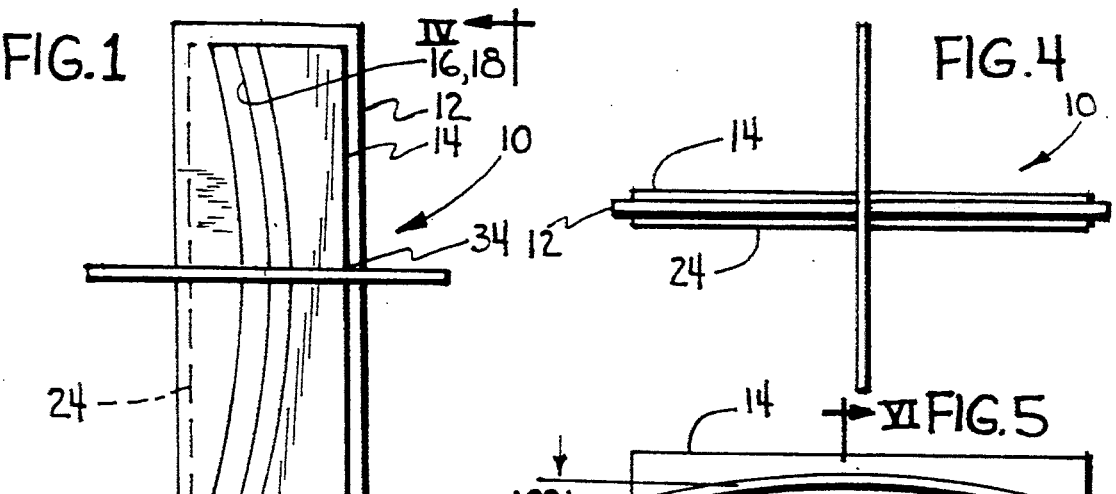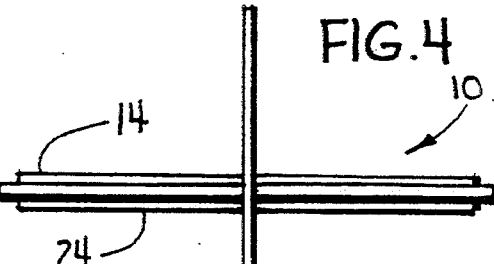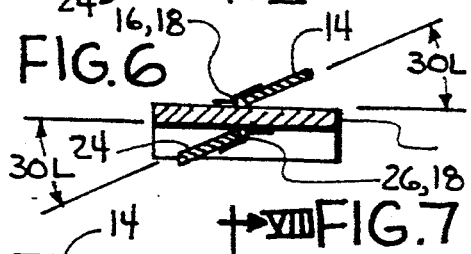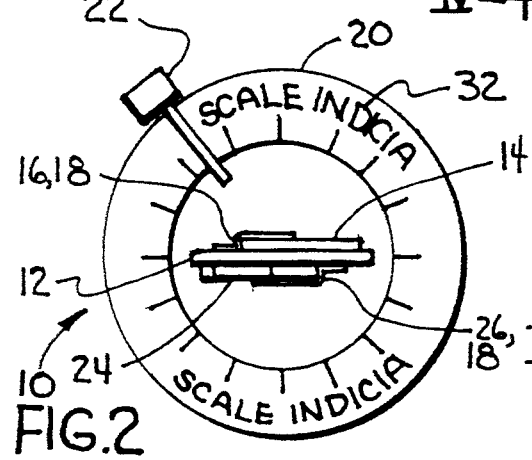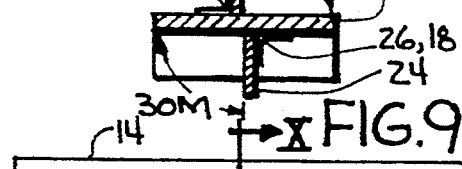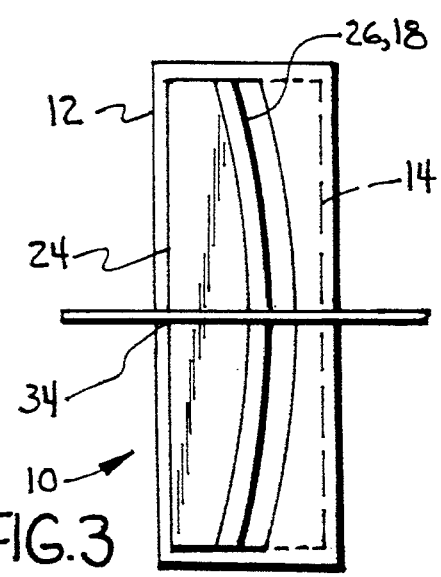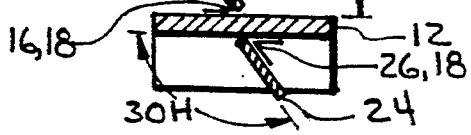

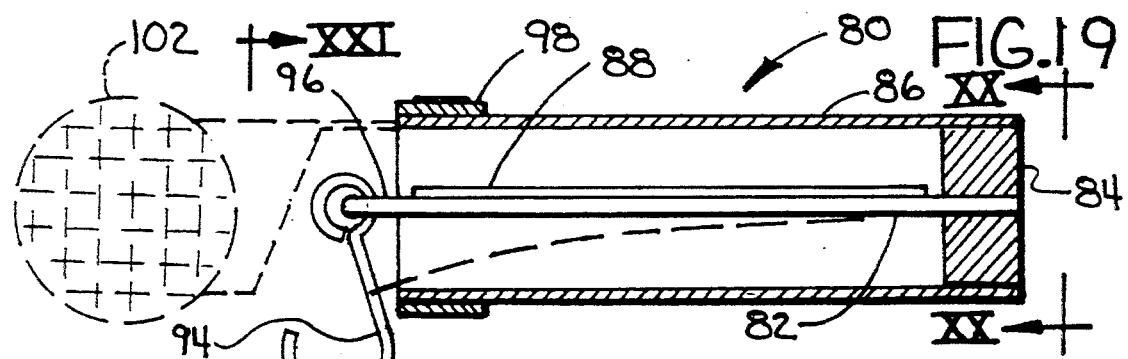
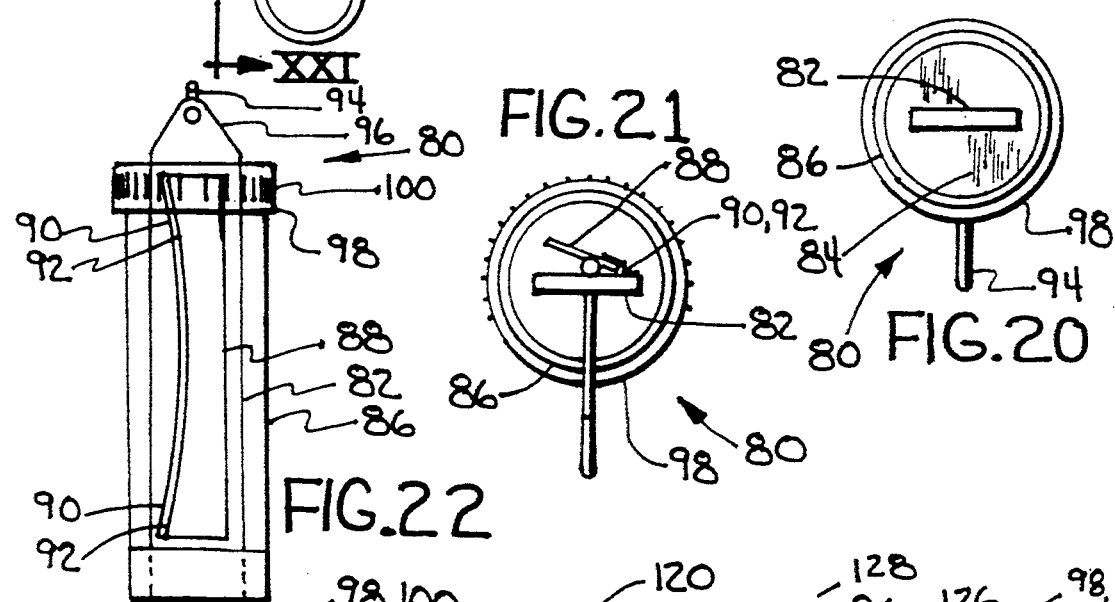
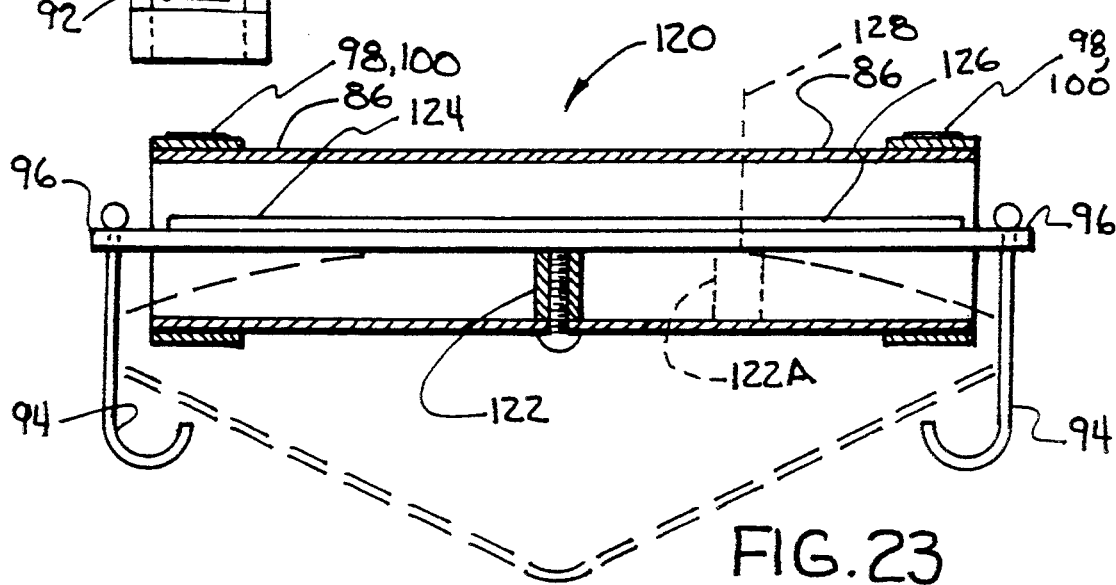

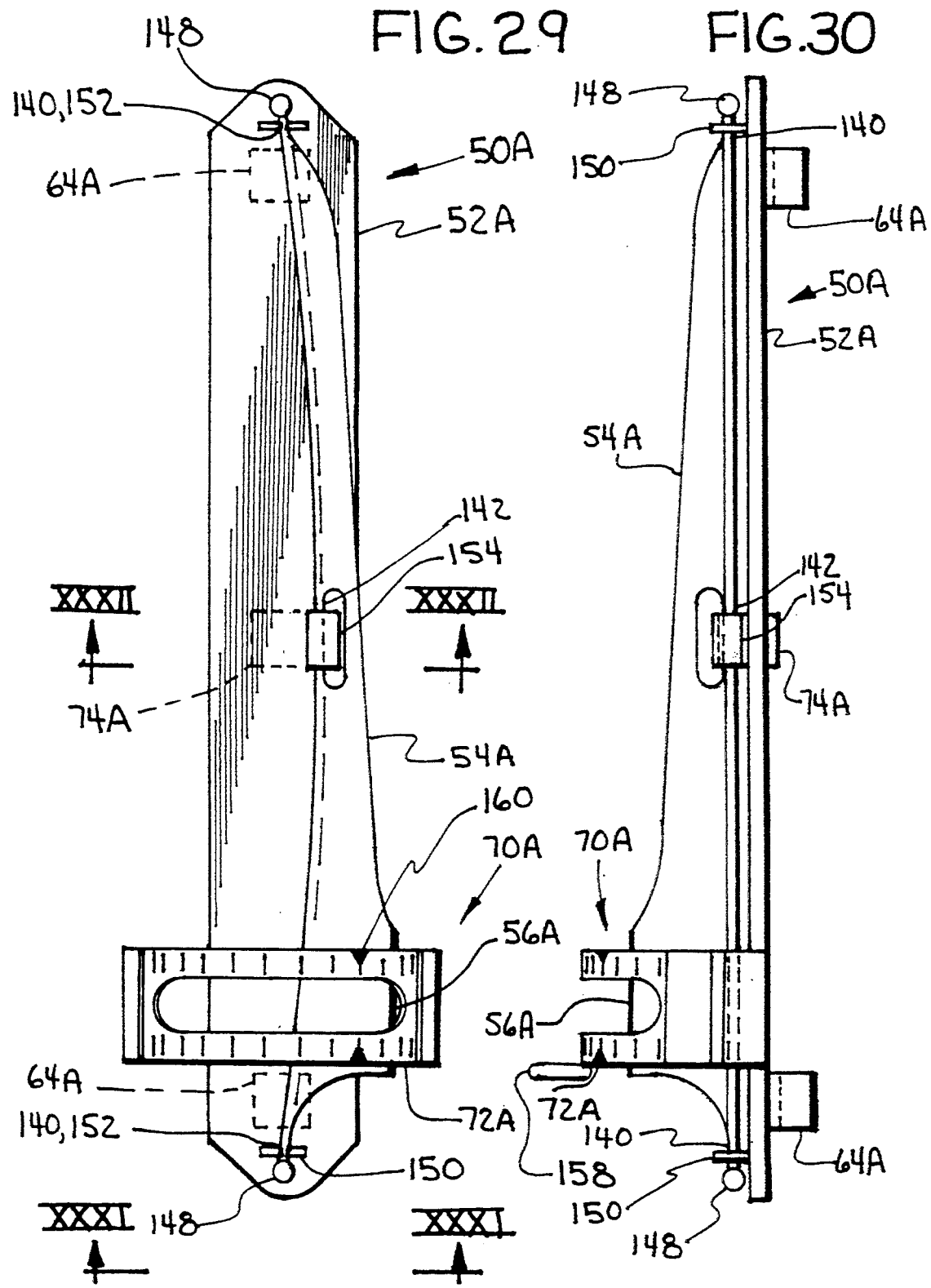

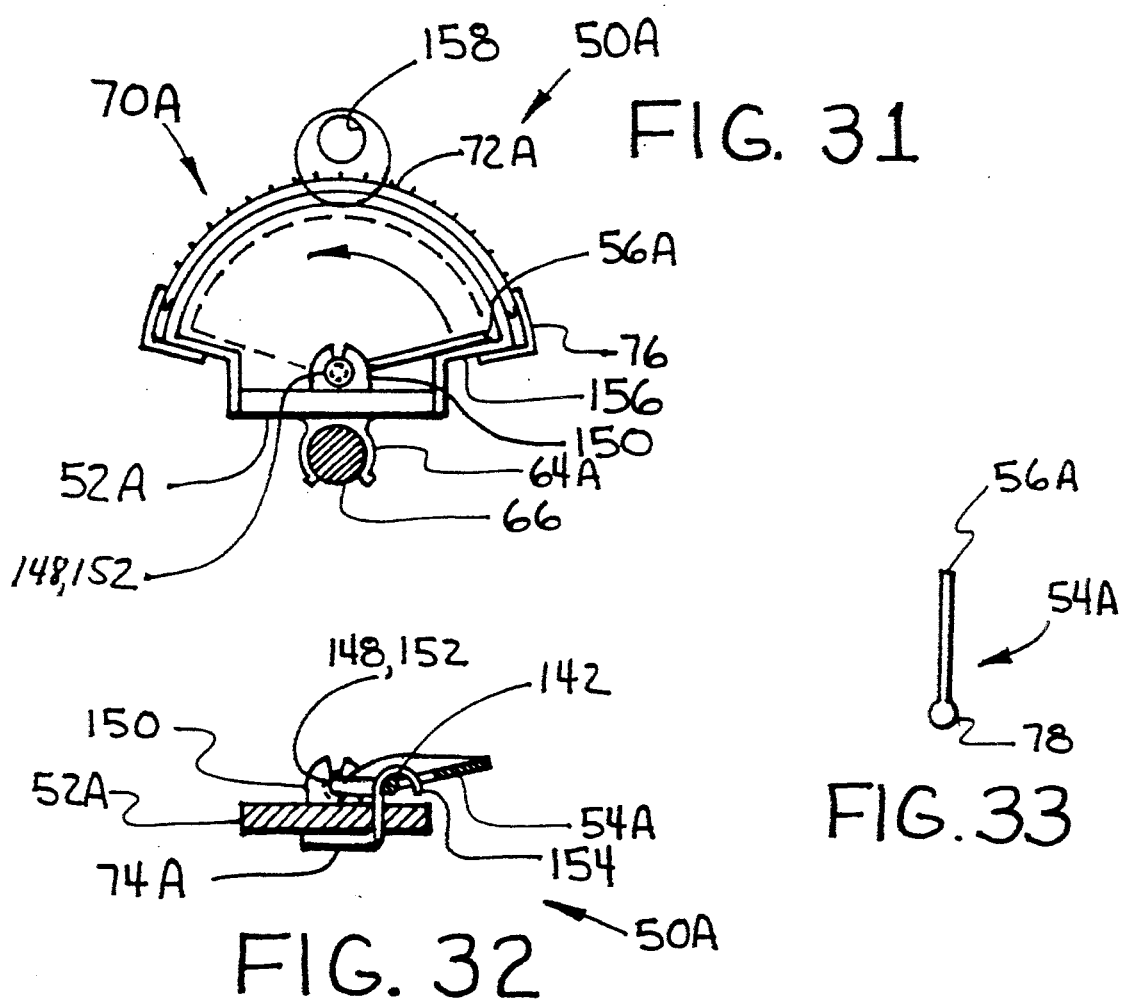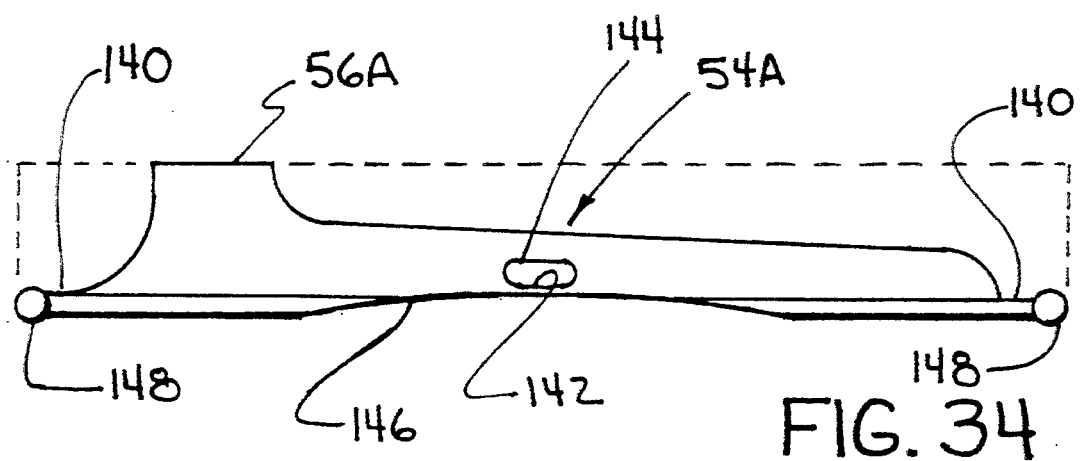

5,396,035

1

METHOD AND APPARATUS FOR MECHANICAL FORCE/WEIGHT OUTPUT

FIELD OF THE INVENTION

This invention pertains to a method and apparatus for mechanically providing a force indicating output, a specific example of which is a weight measurement. Specific embodiments of the apparatus are a weight scale for a fishing rod, and hand held weighing scales.

THE PRIOR ART

No particularly relevant prior art is known, other than what is being commercialized and sold in the market place as of this date.

A couple of examples of fishing rod scale are known. One of these has a scale that goes in and out of the fish rod handle, much like a tire pressure gauge. Another has a wire arrangement that snaps on to the rod.

OBJECTS OF THE INVENTION

It is an object of this invention to provide a new method and a new apparatus for indicating force.

It is an object of this invention to provide a new weight scale.

It is an object of this invention to provide a new fishing rod weight scale.

SUMMARY OF THE INVENTION

A method of indicating force has the steps of engaging the force with a base plate having an obtuse hinge axis thereon, bending the plate and the obtuse hinge axis, rotating an indicator plate about the obtuse hinge axis, measuring the relative rotation, and converting the measured rotation into an expression of force.

Apparatus for indicating force has a base plate, indicator plate, a hinge connecting the plates, an obtuse hinge axis in the hinge, base plate structure to engage the force, and movement indicating structure connected to the indicator plate, for measuring forces exerted on the base plate.

A weight scale has a base plate, an indicator plate, an obtuse hinge axis connecting the plates, a graduated scale adjacent an indicator plate pointer, a handle connected to the base plate, and structure for connecting a load to be weighted.

A fishing rod weighing scale has an elongate base plate, an indicator plate having an output pointer, and obtuse hinge axis in a hinge connecting the plates, a graduated scale adjacent the pointer, and structure for connecting the base plate to the shaft of a fishing rod.

These and other objects and embodiments of the invention will become manifest to those versed in the art upon review of the teachings herein.

BRIEF DESCRIPTION OF THE DRAWINGS

FIG. 1 is a top plan view of the basic physical embodiment of the present invention;
FIG. 2 is an end view of the structure of FIG. 1;
FIG. 3 is a bottom view of the structure of FIG. 1;
FIG. 4 is a side elevational view of the structure of FIG. 1;
FIG. 5 is a low-deflection side view of the structure of FIG. 1;
FIG. 6 is a sectioned end view;
FIG. 7 is a mid-deflection side view of the structure of FIG. 1;

2

Figure 11:
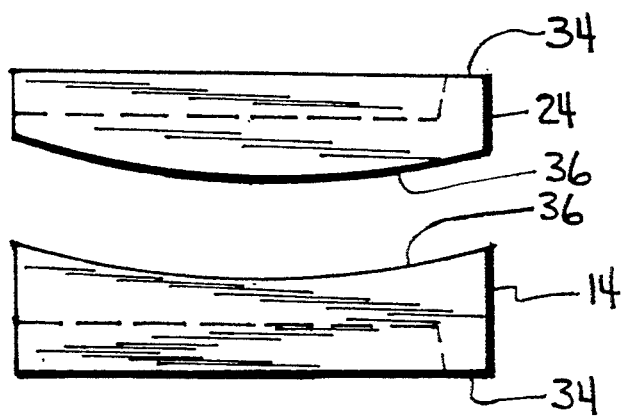
Figure 12:
Figure 13:
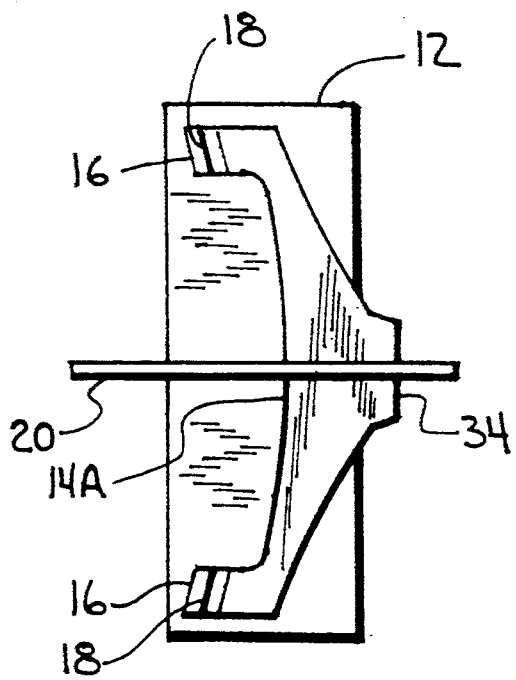
Figure 14:
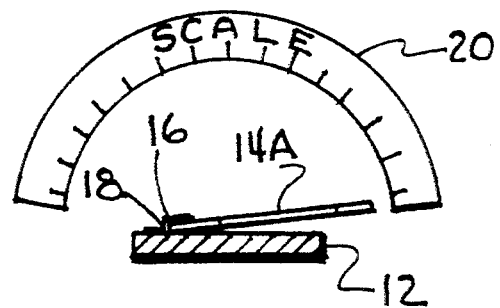
Figure 15:
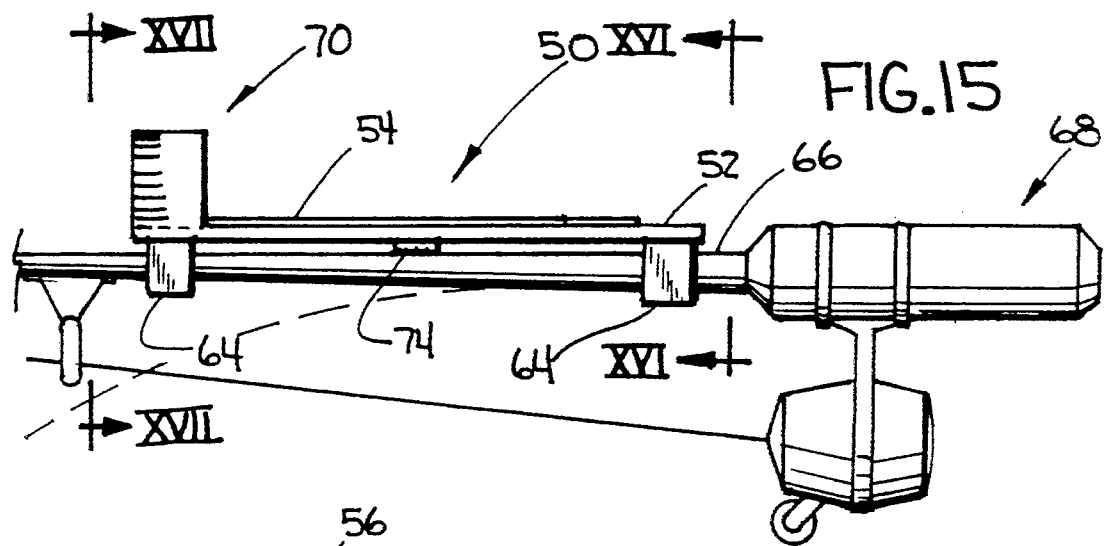
Figure 16:
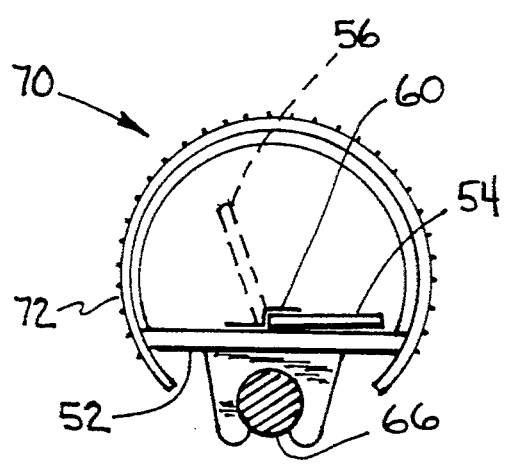
Figure 17:
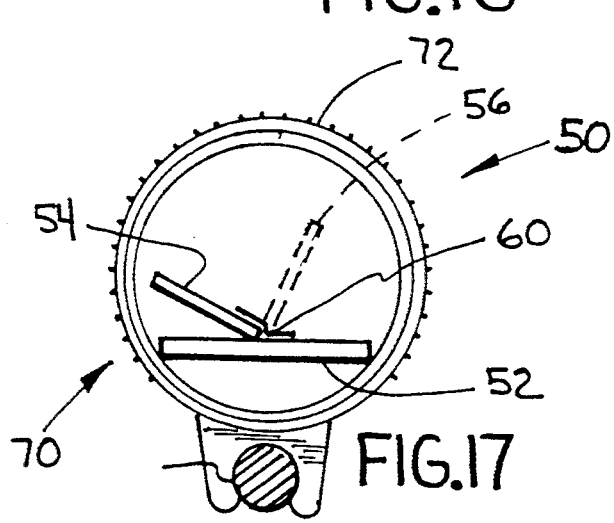
Figure 18:
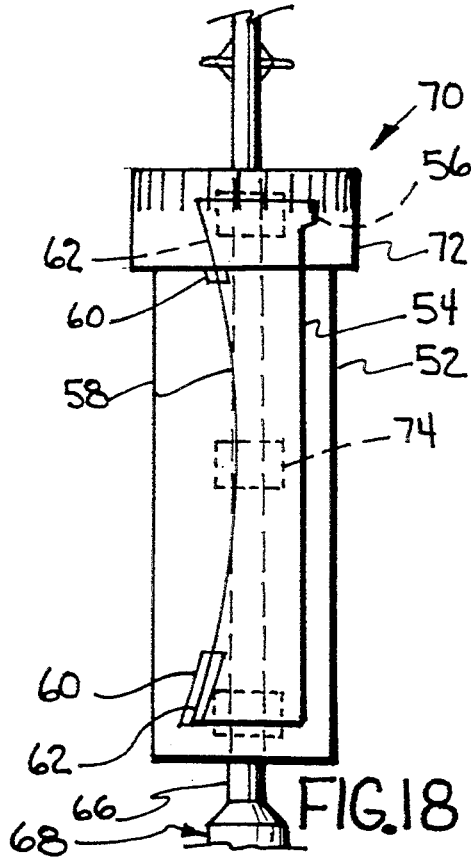
Figure 24:
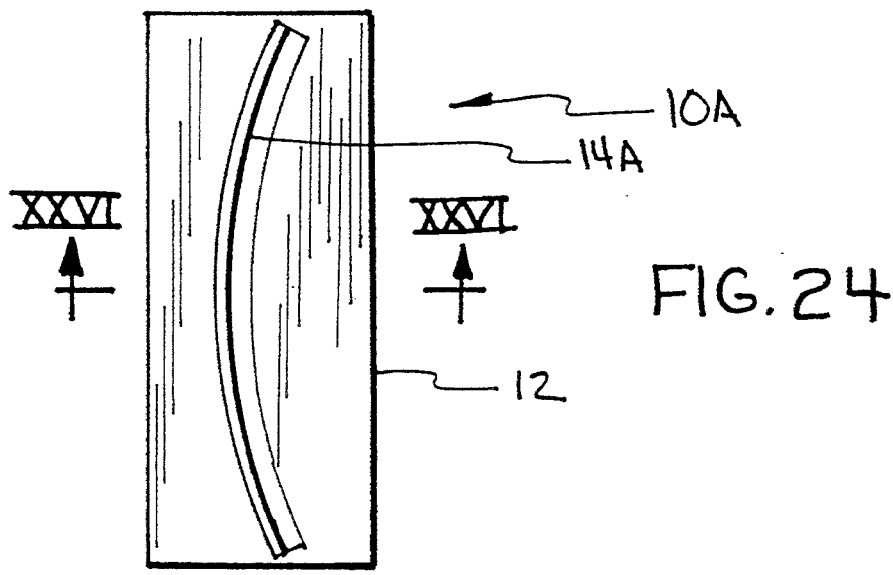
Figure 25:
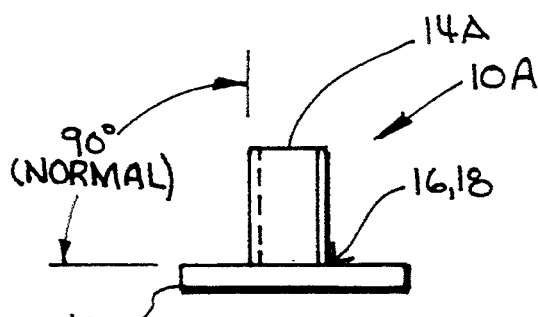
Figure 28:
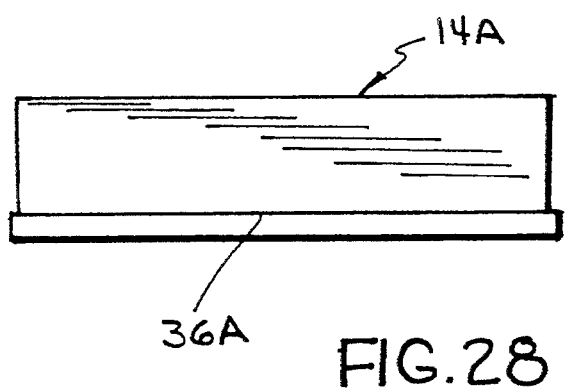
Figure 26:
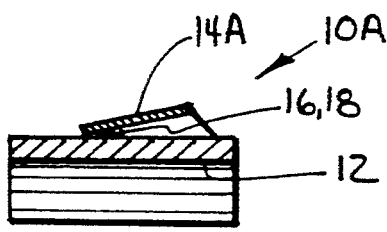
Figure 27:
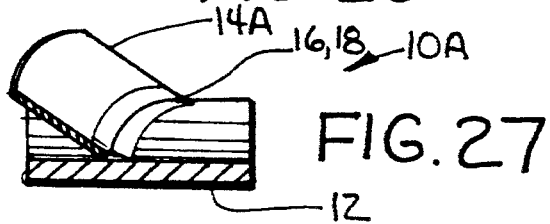

FIG. 8 is a sectional end view;
FIG. 9 is a high-deflection side view of the structure of FIG. 1;
FIG. 10 is a sectional end view;
FIG. 11 is a blank view of the deflector plates of the structure of FIG. 1;
FIG. 12 is a plan view of an alternative deflector plate for the structure of FIG. 1;
FIG. 13 is an alternative embodiment of the structure of FIG. 1;
FIG. 14 is an end view of the structure of FIG. 13;
FIG. 15 is a side elevational view of the structure of FIG. 1 embodied in the preferred embodiment of a fishing rod weight scale according to this invention;
FIG. 16 is an end view of FIG. 15;
FIG. 17 is an end view of FIG. 15;
FIG. 18 is a top plan view of FIG. 15;
FIG. 19 is a side elevational view of the structure of FIG. 1 embodied in a preferred embodiment of a cantilevered weight scale according to this invention;
FIG. 20 is an end view of FIG. 19;
FIG. 21 is an end view of FIG. 19;
FIG. 22 is a top view of the structure of FIG. 19;
FIG. 23 is a side elevational view of a further embodiment of the structure of FIG. 1 in a further preferred embodiment of weight scale according to this invention;
FIG. 24 is a top plan view of a further preferred embodiment of the present invention;
FIG. 25 is an end elevational view of the structure of FIG. 24;
FIG. 26 is an elevational section view through XXVI—XXVI of FIG. 24;
FIG. 27 is a different elevational section through lines XXVI—XXVI;
FIG. 28 is a plan view of the indicator plate in the apparatus of FIG. 24.
FIG. 29 is a top plan view of a further preferred embodiment of a fishing rod scale, according to this invention;
FIG. 30 is a side elevational view of the structure of FIG. 29;
FIG. 31 is an end view from lines XXXI—XXXI;
FIG. 32 is a sectional view though lines XXXII—XXXII;
FIG. 33 is an end view of the indicator plate in the structure of FIGS. 29–32; and
FIG. 34 is a side view of the true shape of the indicator plate in the structure of FIGS. 29–33.

DESCRIPTION OF THE PREFERRED EMBODIMENT

In accordance with the principles of the present invention, basic apparatus for indicating force and for practicing the method of the present invention is shown in FIGS. 1–10, and generally indicated by the numeral 10.

The apparatus 10 includes a base plate 12, an indicator plate 14, a hinge 16 having an obtuse hinge axis 18, and a graduated scale 20 with measurement indicia.

The base plate 12 is an elongated plate, preferably flat, and which is resiliently deformable into a curved (bent) configuration about a bend axis which is transverse to and spaced from the base plate 12. The base plate 12 is preferably resilient and capable of returning itself to its normal flat configuration. The base plate 12 is intended and structured to be bent over along its length as best shown in FIGS. 5, 7 & 9. On a first side of the base plate 12 is a first indicator plate 14. The indicator plate 14 is movably connected to the base plate 12 by a hinge 16. The hinge 16 may be continuous as shown and be of a fiber, or may be segmented into two end hinges, combination of two end and one central hinge, or more discrete hinges, and these segmented hinges may be of solid material such as metal, and have pin hinge joints. A plastic living hinge 16 is also viable. Regardless of the type of hinge 16, the hinge axis 18 is obtuse. The hinge axis 18 may be continuously curved as shown, or segmented into short straight lengths. The obtuse curvature is present however, and its curvature is preferably convex with respect to and at the hinge edge of the indicator plate 14. As seen in FIG. 2, the indicator plate 14 normally is positioned generally parallel to and very close to or against the base plate 12. The apparatus 10 may have a second indicator plate 24 on an opposite side of the base plate 12 from the first indicator plate 14. It has been found that with identical obtuse hinge axis 18 that lie upon each other, specifically the first indicator plate 14 has a concave hinge edge that matches identically with a convex hinge edge of the opposite indicator plate 24, that the angular movement of the two indicator plates 14, 24 will be identical and they will maintain a generally flat plane, or parallelism, to be explained. The second indicator plate 24 also has a hinge 26 to the base plate 14, and the hinges 16, 26 are preferably over/under each other. The two indicator plates 14, 24 as shown in FIG. 2, may be structurally connected to each other and comprise a single flat plane and single structure, the hinge structure 16 may also be interlocking slots as is seen in metal ice tray cube dividers. This type of slotted hinge 16 may also be used on an apparatus 10 having a single indicator plate 14 or 24. The indicator plates 14, 24 may also be transversely spaced from each other, and will still remain parallel to each other.

FIG. 4 shows a side view and FIG. 2 shows an end view of the apparatus 10 of FIG. 1 at rest and without a force applied upon it. The base plate 12 is flat. In FIG. 5, a relatively low force has been applied upon the base plate 12 and it has a low deflection 28 L whereupon as seen in FIGS. 5 & 6, the indicator plates 14, 24 are rotationally moved about the obtuse hinge axis 18 a low angular amount 30 L. In FIGS. 7 & 8, a medium force has been applied upon the base plate 12 and it has been bent and curved a medium deflection 28 M, which gives a medium angular deflection 30 M of the indicator plates 14, 24. In FIGS. 9 & 10, a high force has been applied upon the base plate 12 which causes relatively high bend or curvature deflection 28 H of the base plate 12. This effects a relatively high angular rotation 30 H of the indicator plates 12, 24 with respect to the base plate 14.

It will be seen that the angular deflections of the indicator plates 14, 24 are identical; this is because the curvatures of the hinge axis 16 are identical. It now follows that the angular deflection 30 of the indicator plates 14, 24 is an analog of the force placed upon the base plate 12.

The graduated scale 20 has graduation indicia 32 which enable measurement of the relative rotation of the indicator plates 14, 24 and a selected indicator point 34 thereon, and the gradient indicia 32 convert the deflection output or measurement into a quantified expression of force, for example, pounds or kilograms. A switch or transducer 22 may also take a read-out off of the indicator plate 14.

It is the obtuse hinge axis 18 that causes the indicator plates 14, 24 to rotate with respect to the base plate 12. It is preferable that the indicator plates 14, 24 have an obtuse hinge edge 36 in order to initially be positioned to be generally parallel to the base plate 12.

However, as shown in FIGS. 24–27, an alternative apparatus 10A may have an indicator plate 14A that is initially perpendicular or normal to the base plate 12. The hinge axis 16 remains obtuse, but the indicator plate 14A may have a straight hinge edge 36A which causes the indicator plate 14A to form into the curved and normal configuration on the flat base plate 12 shown in FIGS. 24 and 25. When the base plate 12 is loaded with a force and curved the indicator plate 14A can go either direction. If the base plate 12 is bent down about its center as in FIG. 26, the indicator plate 14A turns toward the concavity of the hinge axis 18; when the base plate 12 is bent upward about its center as in FIG. 27, the indicator plate 14A turns toward the convex side of the hinge axis 18. Again, while it is not shown, there may be an indicator 14A on each side of the base plate 12, and the obtuse hinge axis 18 could be atop and on each other, i.e. "(( ", or be opposite to each other, i.e. "()".

FIG. 11 shows the two indicator plates 14, 24 being fabricated from a single sheet of material, and separated at the hinge edges 36. The indicator plates 14, 24 maybe cut away at the dotted lines to accentuate an integral indicator point 34 at any position along or beyond the length of the indicator plates 14, 24.

FIG. 12 is an alternative indicator plate 14B having a removed central section and spaced apart segmented hinge edges 36B, for use with segmented partial hinges 16, which are shown in FIGS. 13 & 14.

It is preferable that the base plate 12 be bigger and structurally stronger than the indicator plate 14, 24. The base plate 12 is the power source for deflection of the indicator plates 14, 24. The base plate 12 is also resilient within its expected range of deflection, bending and curvature. The indicator plates 14, 24 are also preferable resilient within the performance envelope of their expected bending as they deflect radially about the hinge axis 18, and then return to an at rest unloaded position.

Be it understood, even while it is not shown, that a single base plate 12 may have two or more indicator plates 14 upon it; the indicator plates 14 may be rotationally mounted with hinges having relatively concave or convex obtuse hinges axis, the plates may be on the same side or opposed sides of the base plate 12, and the indicator plates 14 may have either convex, concave, or straight hinge edges.

The fishing rod weight scale shown in FIGS. 15–18 and generally indicated by the numeral 50 has a base plate 52, an indicator plate 54 with an indicator point 56 and a concave hinge edge 58, a hinge 60 movably connecting the plates 52, 54 together, and an obtuse hinge axis 62. On the bottom side of the base plate 52 are a pair of spaced apart clamps 64 to secure the base plate 52 and the rod weight scale 50 to the shaft 66 of a fishing pole 68. An abutment 74 maybe provided between the clamps 64 to accentuate bending of the base plate 52 when the rod shaft 66 is bending under the weight of a fish. As the shaft 66 and base plate 52 bend, the indicator plate 54 and pointer 56 rotate as shown in dotted lines in FIGS. 16 & 17. A tubular graduated scale 70 is mounted to the base plate 52 and surrounds the indicator point 56. The graduation indicia of the scale 70 is on a tubular collar 72 which is frictionally held in place. The collar 72 maybe manually turned (or changed) to zero, or true in a particular fishing rod 68 to get the weight scale 50 to read correct weight. The collar 72 may be a C-shaped partial tube as in FIG. 16 or a closed tube as in FIG. 17. The rod weight scale 50 is easily installed on or changed from fish rod 68 to fish rod 68, and the scale collar 72 enables rapid easy adjustment of scale weight output readings for variations in deflection among different fishing rods 68.

FIGS. 19-23 show various hand or tool held weight scales. In FIGS. 19-22, the weight scale 80 has a base plate 82 secured by a base piece 84 to a tube 86. The tube 86 is preferably transparent, is the handle by which the weight scale 80 is held, and the base plate 82 is positioned to be spaced from the tube 86. Atop of the base plate 82 is an indicator plate 88 movably secured by an hinge 90 having an obtuse axis 92 as previously described. At the distal and cantilevered end 96 of the base plate 82 is a hook 94 or other structure to operatively connect the scale 80 to the mass, weight, or force or phenomena to be measured. About the open end of the tube 86 is a frictionally held scale collar 98 with the graduated scale indicia 100 thereon. The transparent collar 98 can be manually rotated to true up the weight scale 80. This particular embodiment of a scale 80 can be integrated in the handle of a fish net 102. This apparatus 80 is an ideal fish scale.

A further embodiment of a weight scale 120 is shown in FIG. 23 and is ideal for weighing pails and heavier objects. It is a double ended version of the FIG. 19 weight scale 80. This particular weight scale 120 has a center mounted base plate pedestal 130 which makes both end graduated scales read the same. The pedestal 130 may optionally be moved off center to the dotted line position, 130A, and a pair of indicator plates 124, 126 may be atop the base plate 122 and be split or separated at the line 128. Whereupon, the long side of the base plate 122 will be a relatively fine weight scale, and the short side of the base plate 122 will be a relatively heavier and coarser weight scale. The collars 98 and indicia 100 will be of different scalar values to reflect the differences in the heavier and fine scales.

All of these apparatus 10, 50, 80, 120 are preferably made of plastic and are not subject to corrosion. The base plates 12, 52, 82, ideally may be made of fiber-filled or engineering quality plastic, as are the smaller indicator plates. The apparatus 10, 50, 80, 120 are quite economical, commercially viable, and very usable.

In FIGS. 29-32, a preferred production and commercial embodiment of a fish rod scale 50A is shown with an elongate and generally flat base plate 52A having attachment clips 64A and an abutment 72A as previously taught. Atop of the base plate 52A is an indicator plate 54A having an indicator point 56A which is inside of a tubular graduated scale 70A. The scale 70A includes a positionally adjustable collar 72A which carries graphic measurement indicia, and which is frictionally held in place by some type of collar fastener structure 76, or by compressive gripping or by other means. Regardless, the indicia scale and collar 72A is adjustable to zero or true in the scale 50A on a variety of different fish rod shafts 66. The indicator plate 54A as best shown in FIGS. 33 & 34, is preferably of sheet plastic and maybe an extrusion having the section shown in FIG. 33, and have a lower shaft or hinge pin bead 78. The indicator plate 54A sheet blank shown in dotted lines in FIG. 34 is cut to length and then trimmed fore and aft to give a pair of end hinges shafts 140, the indicator pointer 56A, and a central hinge shaft 142 at the base of a central hinge aperture 144. The central hinge shaft 142 is spaced upward from the two end hinge shafts (or pins) 140 which effectively constructs a concave obtuse hinge axis wherein the hinge has three joints, two end and one central. The indicator plate 54A is preferably provided with a central bottom relief 146 between the end shafts 140 & directly under the central shaft 142. At the outer ends of the ends shaft 140 are diametrically or sectionally enlarged shaft caps 148 which may be plastic balls or caps fastened to the end shaft 140, or which may be enlarged sections of end shafts 140 made by such processes as hot heading, sonic heading or the like.

The base plate 52A is provided with a pair indicator end pedestals 150 which each have an opened end journal 152, and a central journal structure 154 which is offset to one side from the end journals 152 to form an obtuse hinge axis having three hinge joints.

The end hinge shafts 140 snap into the opened end journals 152, and the central hinge shaft 142 snaps into the central journal structure 154. Then the indicator plate 54A will spring over to one side as best seen in FIG. 31 and stop against a zero stop 156. The indicator plate 54A is held in the pedestals 150 along the fore and aft by the end caps 148 or alternatively by the fit of the central aperture 144 on the central journal 154.

All components of this fish rod scale 50A are preferably plastic, and not subject to corrosion from water.

If it is desirable to press a fishing line over the scale 50A, an eye 158 may be secured to the top of the scale 50A by means of several variations of structure.

In operation and use, as the fish rod shaft 66 bends under a load, the base plate 52A also bends and the indicator plate 54A rotates and the pointer 56A indicates a specific amount. To correlate and zero or true in the scale 50 or 50A, a common standard and easily found weight, such as a full twelve ounce beverage can (soft drink, beer, etc.) is hung on the end of the fish line out of the last eye of the fish rod and the adjustable scale collar 72 is positionally moved until a standard hash mark 160 is aligned with the pointer 56A. The scale 50, 50A is then trued up for the particular fish rod shaft 66 it is mounted on.

The scales 50, 50A may be secured to the fishing pole 68 by snap on clips 64, 64A as shown, by clamps, by adhesives or by fasteners. It is preferred that the graduated scale be adjustable and that a standard and commonly available weight (i.e. 12 oz. beverage can) be used to true the graduated scale indicia. It may be desirable to offset the base plate 52, 52A to one side of the fish rod shaft 66 to best operate the indicator plate 54, 54A. Both of the base plate 52, 52A and the indicator plates 54, 54A are preferably initially flat, and resilient to the initially flat configuration. It is preferable that the base plate 54, 54A being a stronger resilient element than the indicator plate 54, 54A.

I have expectations that the basic apparatus 10 shown and described herein, is also useful when embodied in such things as a pitch control for blade(s) in a wind generator, weight machines for exercise and work out, and a wing deflection gauge for aircraft.

Although other advantages may be found and realized and various modifications may be suggested by those versed in the art, be it understood that I embody within the scope of the patent warranted hereon, all such embodiments as reasonably and properly come within the scope of my contribution to the arts.

Many other advantages, features and additional objects of the present inventions will become manifest to those versed in the an upon making reference to and use of the detailed description and accompanying drawings in which the preferred embodiments incorporating the principles of the present inventions are set forth and shown by way of illustrative example.

I claim as my invention:

1. A method of indicating force, comprising the steps of
   a) engaging the force with a generally planar base plate, said base plate having a hinge having a curved hinge axis;
   b) bending the plate and the curved hinge axis;
   c) rotating an indicator about the curved hinge axis during bending of the plate;
   d) measuring rotation of the indicator; and
   e) converting the measured rotation into an expression of force.

2. The method of claim 1, in which said base plate is initially flat, and the step of bending causes the plate to become curved.

3. The method of claim 1, in which said indicator rotation is measured with respect to a plane of the base plate.

4. The method of claim 1, including the further steps of mounting the base plate to a resilient structure for carrying the force, and measuring the indicator rotation with respect to the base plate.

5. The method of claim 4, including the further steps of securing opposite ends of the base plate to the structure.

6. The method of claim 4, including the further step of abutting a central portion of the base plate against the structure.

7. The method of claim 1, including the step of expressing the force as a measured weight.

8. Apparatus for indicating force, comprising
   a) a base plate;
   b) an indicator plate;
   c) a hinge connecting said plates movably to each other, said hinge having a curved hinge axis;
   d) means on said base plate for engaging two forces;
   e) means on said indicator plate for indicating movement of said indicator plate with respect to said base plate, as a measure of the forces engaged by said base plate.

9. The apparatus of claim 8, in which said base plate is initially flat.

10. The apparatus of claim 8, in which said indicator plate has an obtuse curved edge connected to said hinge.

11. The apparatus of claim 8, in which said indicator plate is initially flat.

12. The apparatus of claim 8, in which said base plate is a resilient material.

13. The apparatus of claim 8, in which said hinge axis is curved upon said base plate, and curved upon said indicator plate.

14. The apparatus of claim 8, in which said base plate has a larger cross-section than said indicator plate.

15. The apparatus of claim 8, including a scale member secured to one of said plates for measuring movement of said plates with respect to each other.

16. The apparatus of claim 8, used as a weight scale.

17. A weight scale comprising
   a) an elongate base plate;
   b) an indicator plate having an output pointer;
   c) a hinge connecting said base plate and said indicator plate movably to each other, said hinge having a hinge axis which is curved;
   d) a graduated scale on a scale member in proximity to said pointer for prodding a visual quantification of the pointer position, such position being indicative of a measured weight;
   e) handle means connected to said base plate for holding said base plate; and
   f) weight connecting means for connecting said base plate to a load to be weighted.

18. The weight scale according to claim 17, in which said base plate and said indicator plate are inside of a tube, said base plate being fixed to said tube.

19. The weight scale according to claim 18, in which said handle means is of said tube.

20. The weight scale according to claim 18, including a friction ring secured to said tube, said graduated scale member being said friction ring and being positionally adjustable on said tube.

21. The weight scale according to claim 18, in which said indicator plate is completely within said tube.

22. The weight scale according to claim 18, in which base plate is spaced from said tube.

23. The weight scale according to claim 17, including a second graduated scale on a second scale member in proximity to a second pointer connected to a second indicator plate which is connected to said base plate by a hinge with a curved hinge axis, said base plate connected to a second weight connecting means, said first graduated scale and said second graduated scale being of different scalar values.

24. A fishing rod weighing scale, comprising
   a) an elongate base plate;
   b) an indicator plate having an output pointer;
   c) a hinge connecting said base plate and said indicator plate movably to each other, said hinge having an axis which is curved;
   d) a graduated scale on a scale member in proximity to said pointer for enabling visual reading of the pointer with respect to the graduated scale and;
   e) means for connecting said base plate to the shaft of a fishing rod.

25. The fishing rod weighing scale according to claim 24, in which said connecting means, and said indicator plate, are on opposite sides of said base plate, respectively.

26. The fishing rod weighing scale according to claim 24, in which said connecting means consists of two members which are on opposite ends of said base plate, respectively.

27. The fishing rod weighing scale according to claim 26, including a rod-to-base plate abutment in between said two members of said connecting means.

28. The fishing rod weighing scale according to claim 24, in which said curved hinge axis is concave, with respect to said indicator plate.

29. The fishing rod weighing scale according to claim 24, in which said hinge is continuous and extends a full length of said indicator plate.

30. The fishing rod weighing scale according to claim 24, in which said base plate and said indicator plate are both comprised of plastic.

31. The fishing rod weighing scale according to claim 24, in which said scale member is fastened to said base plate.

32. The fishing rod weighing scale according to claim 24, in which said scale member is tubular and has radially spaced apart graduations.

33. The fishing rod weighing scale according to claim 32, in which said scale member is comprised of a friction ring, said friction ring and the graduations thereon having means for being positionally adjustable with respect to said base plate.

34. The fishing rod weighing scale according to claim 24, including means for snap-assembling said indicator plate to said base plate.

35. The fishing rod weighing scale according to claim 24, in which said hinge axis is curved on both said base plate and on said indicator plate.

* * * * *